(12) United States Patent
Moore et al.

(10) Patent No.: US 7,200,566 B1
(45) Date of Patent: Apr. 3, 2007

(54) METHOD AND SYSTEM FOR LOCAL WIRELESS COMMERCE

(75) Inventors: Victor S. Moore, Boynton Beach, FL (US); Edith H. Stern, Hawthorne, NY (US); Barry E. Willner, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,643

(22) Filed: Jan. 11, 2000

(51) Int. Cl.
*G06Q 30/00* (2006.01)
(52) U.S. Cl. ....................................................... 705/26
(58) Field of Classification Search ................ 705/26, 705/1, 35, 37, 27; 455/3.05, 456.6; 370/913; 709/217, 219, 249
See application file for complete search history.

(56) References Cited

U.S. PATENT DOCUMENTS

| | | | |
|---|---|---|---|
| 5,371,780 A | 12/1994 | Amitay | 379/58 |
| 5,664,110 A * | 9/1997 | Green et al. | 705/26 |
| 5,684,801 A | 11/1997 | Amitay et al. | 370/447 |
| 5,774,877 A | 6/1998 | Patterson et al. | 705/35 |
| 5,794,207 A | 8/1998 | Walker et al. | 705/23 |
| 5,797,002 A | 8/1998 | Patterson et al. | 395/611 |
| 6,317,718 B1 * | 11/2001 | Fano | 705/1 |
| 6,397,197 B1 * | 5/2002 | Gindlesperger | 705/37 |
| 6,434,159 B1 * | 8/2002 | Woodward et al. | 370/401 |
| 6,647,373 B1 * | 11/2003 | Carlton-Foss | 705/37 |

FOREIGN PATENT DOCUMENTS

JP 61103326 10/1984

(Continued)

OTHER PUBLICATIONS

Smart Marketing + New Teen Portal = Increased Traffic PR Newswire, Oct. 3, 2001.*

(Continued)

*Primary Examiner*—Ronald Laneau
(74) *Attorney, Agent, or Firm*—Cuenot & Forsythe, L.L.C.

(57) ABSTRACT

A system and method of conducting commercial activities such as an auction in a rather localized area (such as a shopping mall). Potential consumers located in the local area have a mobile wireless communications device (for example, a smart cellular phone or a 2-way radio or a Bluetooth communication device) including a set of stored instructions allowing the device to be programmed with a set of desired transactions and preferences such as the brands or transaction types which the consumer prefers. Merchants are connected to receive a communication from the communications device and respond to the desired transaction and preferences by proposing goods or services at specific terms such as price. The mobile wireless communications device associated with the potential consumer has the potential to receive communications from merchants (either directly or through an intermediate system) and to transmit a communication back to the merchant indicating the potential offer so that a merchant can revise or improve the offer. In this way, local merchants can be aware of the offers that a consumer receives and can improve on those offers to secure the potential consumer's business. While the actual transaction may be conducted in person at the merchant, one can envision a system where the transaction is completed through the wireless communication system with the payment occurring through charge or other electronic transaction and the delivery of the goods or service through conventional delivery channels.

14 Claims, 6 Drawing Sheets

FOREIGN PATENT DOCUMENTS

| | | |
|---|---|---|
| JP | 09319801 | 9/1996 |
| JP | 10320481 | 5/1997 |
| JP | 11066205 | 8/1997 |
| JP | 11068185 | 8/1997 |
| JP | 11068186 | 8/1997 |
| KR | 2001092559 A * | 10/2001 |
| TW | 318910 | 12/1995 |

OTHER PUBLICATIONS

INSPEC Accession No. 6372164 S. Y. Hwang et al., "Two Auction-based protocols for fair and fast resource assignment".

INSPEC Accession No. 6253132 T. P. Wang et al., "A fair protocol for fast resource assignment in wireless PCS networks".

INSPEC Accession No. 5743122 S. Harano et al., "Computerized Auction System by Radio Terminals".

INSPEC Accession No. 5707998 Choi et al., "Performance analysis of enhanced RAMA protocol for statistical multiplexing of speech in wireless PCS".

INSPEC Accession No. 5443455 F. Kahn et al., "Analysis of reservation multiple access schemes for wireless PCS".

INSPEC Accession No. 5380534 Barrantes Sliesarieva SA, "An indexed access mechanism for wireless networks".

* cited by examiner

METHOD AND SYSTEM FOR LOCAL WIRELESS COMMERCE

BACKGROUND OF THE INVENTION

1. Field of the Invention

The present invention is an improved system and method for facilitating commercial transactions, at least in part through the use of electronic data processing and communications systems including a mobile wireless device which is associated with a consumer. The mobile wireless device stores consumer preferences and desired transaction(s) and communicates only with merchants in a limited local area to receive localized messages from merchants proposing transaction(s) which may be related to the stored desired transaction(s) and consumer preferences.

2. Background Art

Typical retail commerce in the United States is initiated by a consumer, dealing in person or over a network with a merchant who has relatively fixed prices for merchandise. With a few exceptions, the merchant has established his prices for his goods and services and operates from a fixed location where consumers can visit, inspect the goods and purchase them if the terms are acceptable.

Alternatives to in-person, sales occur through the use of Internet purchases and through catalogs and television networks like the Home Shopping Network, where a merchant is located at a distant (and frequently unknown) location and the consumer sees and purchases his good though remote communications. The remote communications can be through a credit card purchase over the Internet or through a telephone access. Inherently in such catalog, Internet and network shopping, the idea is to overcome the distance between the merchant and the consumer, because, with Internet communications and with Wide Area Telephone service (WATS line for so-called 800- or toll-free calls), the distance between the merchant and the consumer has been ignored, at least to some extent.

In a typical retail environment, it is difficult for a merchant to know what consumer is located within his immediately geography, let alone what that consumer is thinking of buying and what's important to the consumer. From the consumer's perspective, he is usually not aware of all of the merchants in his immediate geography who are offering a particular item (and/or any acceptable substitute) and at what price the merchant is offering the item. Also, the consumer will not know whether the merchant is willing to bargain on the price or other terms of the transaction in order to secure the business, unless the consumer sees advertising from the merchant or sees the merchant face-to-face and discusses the possible transaction. Such a system of personal visit to the merchant and discussion of price and other terms is slow and assumes that the consumer will have good information of the marketplace (what other merchants are offering and at what price and terms) prior to beginning his discussions with a merchant.

Auctions are known, both in a conventional sense (where an auctioneer in person auctions off a variety of goods to those participating in the auction in person, through closed circuit television and telephone) and over the Internet. Various auction systems have been established over the Internet, including those like e-Bay.com and PriceLine.com, providing remote purchasers with the opportunity to deal with remote sellers on terms proposed by one of the parties and accepted by the other party, with the negotiations occurring from afar and frequently from unknown locations.

In the case of PriceLine.com, the buyer specifies the price that he is willing to pay for a generalized good or service (an airline flight within a window of time between fixed locations or a hotel room for fixed period within a geographic area), then the buyer's offer is shopped to various potential vendors for one who would accept the transaction at the price proposed. In the case of e.Bay.com, goods which are described by the seller are offered at auction to those who may participate in an auction for the goods.

In the case of e-Bay.com and PriceLine.com, as well as catalog shopping and televised shopping networks, the merchants and the buyers can be located almost anywhere—truly a worldwide commerce opportunity, if shipping distances and import/export considerations across borders can be ignored. A worldwide market may be appropriate for selling goods, either in high volume or at an auction, where large numbers of distant shopper add to the market opportunity, but when the merchant has a store and does business in person, his likely customers are located nearby and his advertising of limited time specials would be best suite to those potential customers who are nearby—and communicating offers to others might be considered inefficient.

In some geographic areas (particularly outside the United States) the merchant sell goods to buyers through bazaar-like markets, where the prices are not fixed but the buyers must actually meet the seller before knowing what the seller is offering and at what price. Frequently in such bazaar-like settings, the prices are adjusted periodically by the merchant in an attempt to sell the most at the greatest gross revenue per unit, particularly if the goods have a limited usefulness.

It is difficult for a merchant operating from a fixed location like a conventional storefront to establish communications with his potential customers located in his local area about how his offerings match the consumer's desires, even when the consumer and the merchant are in close spatial proximity, as they might be when a consumer is in the same shopping mall. The consumer may have either a specific item in mind (e.g., a Sony-brand 27" color television model KV27FV15) or may be seeking something generally (such as a color television with a diagonal viewing area of about 25 inches). Sometimes, the consumer will be shopping for the lowest possible price for his purchase, sometimes for a particular brand, and still other times, for a particular feature or set of features (cable-ready, remote control, etc.) in mind. For some purchases, the consumer may be seeking a particular warranty or service term (local service, on-site repair, three year replacement warranty, etc.), and at still other times the consumer may be influenced by such a mixture of these terms that the consumer himself has not sorted through and is subject to influence by an appropriate offer from a merchant. In still other situations, the consumer is not aware of his being a potential purchaser of a commodity (such as food for lunch or an impulse item) until an advertisement for the food appears to him and then he realizes that food would taste good, since his shopping activity has made him hungry.

In any event, it is not easy in the prior art for a merchant to know what a consumer intends to purchase or what competing offers might be made by other merchants offering the same or similar products. While some merchants sell merchandise only at a fixed price, other merchants eagerly seek additional sales and are willing to negotiate the price in return for an additional, immediate sale. Some merchants will reduce prices or make other special offers when business is slow (such as an automotive service business when there are empty bays and idle mechanics available to service cars), but do not wish to make such offers generally known.

Various systems allow for purchases to be made remotely, such as catalog sales, home shopping networks and 800-number sales. Additionally, more and more sales are being conducted over the Internet. These systems usually provide for the goods or service to be purchased sight unseen (or based on a limited viewing a picture of the article on a screen or in a catalog) and shipped to the consumer, frequently incurring significant shipping and handling charges for goods which may or may not appear as attractive in reality as they appear on paper or on the screen.

Some systems provide for Internet-based sales and even auctions, but these are frequently with sellers whose reputations is unknown and who may be located a distance from the purchaser (or even at an unknown place), making the transaction at risk and possibly subject to delays in acquiring the goods. Sometimes, goods purchased through an Internet auction have not arrived and, at other times, the condition of the goods when they arrived was disappointing. In any event, goods ordered remotely will not arrive for some period of time, depending on how quickly the order is processed, packed and shipped and the method of shipment.

Accordingly, the prior art systems of merchandising have undesirable disadvantages and limitations.

SUMMARY OF THE INVENTION

The present invention overcomes the limitations and disadvantages of the prior art systems by providing a local area communications system with a mobile wireless device in which the consumer has stored a "wish list" of desired transactions and/or some consumer preferences. The merchants can use a data processing system to "read" the stored information from these mobile wireless devices (the desired transactions and/or preferences) while the consumer is located within the proximate area of the merchant and communicate interactively with the mobile wireless devices individually to provide an offering of goods or services. This communication to a consumer from merchants can be direct (via a communication device associated with only the one individual merchant) or through a shared served to which an individual merchant (along with other merchants) is connected.

The present invention has the advantage that it is simple yet effective in allowing the potential consumer to advise local merchants of his wants and needs in the form of a set of desired transactions and/or other preferences (characteristics of his proposed transaction) and allow the merchant to advise the consumer what the merchant offers that consumer along the lines of the proposed transaction. In advising the consumer, the merchant may propose either an exact match of what the consumer has indicated or the merchant may propose something different, or the merchant may do both, as when the merchant is prepared to offer a slightly different product at a more attractive price. The merchant may also propose related goods and services such as accessories and/or service plans of varying scope in his communication with the consumer.

Frequently, the consumer will be interested in the price comparison between merchants selling what seem to be similar goods, either because the goods are fungible or because, in the mind of the consumer, the goods are functionally similar enough to be compared and a substitute to be purchased if the transaction is attractive.

The present invention allows for the interactive communication between the consumer and one or more merchants, for example, to clarify the offering or to allow for an auction to be conducted wherein the consumer requests a better price or different terms like warranty and service, perhaps in response to competing offers from different merchants for the proposed transaction.

The present invention allows a merchant to provide an advertisement which may or may not be based upon the stored information (such as the consumer preferences) in the wireless device. This would allow a merchant of an impulse item—such as a meal—the advertise his meal and any special he might be offering, even though the consumer did not list a meal as a proposed transaction.

Using the present invention allows a merchant to provide a very limited offering, based either on time or on store conditions. For example, a restaurant might offer a meal special for times when the restaurant is empty and withdraw the offer when the restaurant has filled up or the time is approaching a meal time. Since the present invention allows for merchants to address the potential customers individually, the merchant can propose different transactions to different potential customers. This would allow a merchant to propose different package offers or offers based on attributes of the potential customer, like being frequent shopper or being an early adopter of technology, attributes which would be stored in the preferences portion of the portable device carried by the consumer. The present invention also allows the merchant to make an offer to a limited audience of potential customers, so the merchant is not overwhelmed by the response to an offering, as a merchant might be if he were to advertise in a widely-distributed medium such as a newspaper or on radio.

The present invention has the advantages that the merchants and the consumer are in the same local area and it will not be necessary to accomplish a remote transaction with the attendant costs of shipping and handling and the delays associated with shipping. The local area allows for the consumer to see the goods involved (if desired) and knows that the merchant has an established place of business rather than just an unknown address in some distant location, as may be the case in transactions occurring over the Internet or by toll-freeing calling.

Other objects and advantages of the present invention will be apparent to those skilled in the relevant art in view of the following description of the preferred embodiment, taken together with the accompanying drawings and the appended claims.

BRIEF DESCRIPTION OF THE DRAWINGS

Having thus described some of the objects and advantages of the present invention, others will be apparent to those skilled in the appropriate art in view of the following description of the invention in which:

DETAILED DESCRIPTION OF THE PREFERRED EMBODIMENT

In the following description of various embodiments of the present invention, the best implementations of practicing the invention presently known to the inventors will be described with some particularity. However, this description is intended as a broad, general teaching of the concepts of the present invention in a specific embodiment, but it is not to be interpreted as limiting the present invention to that as shown in these embodiments, especially since those skilled in the relevant art will recognize many variations and changes to the specific structure and operation shown and described with respect to these figures.

The present invention envisions that consumers in a defined local area will communicate with local merchants through the use of mobile wireless devices. Each consumer who is participating in the commerce system of the present invention may be mobile over time (but may be, at any given time, be stationary) and has a communication device which may also be mobile, either because the consumer carries it or it moved along with a consumer who wears it or brings it along with a shopping cart or other device such as a mobile cart. Communication between each consumer and each merchant may be effected, as described in later paragraphs of this document, through one or more of the following presently-available communications techniques: so called two-way radios, a cellular telephone system or a Bluetooth-type communication system. Other forms of wireless communications could be employed to advantage in the present system as well, such as HomeRF or wireless LAN, either alone or with suitable modifications for the environment of a local retail area like a shopping mall, including its size and environmental effects. In addition, it is anticipated that additional or alternate forms of local communications techniques may become available which have similar characteristics and can be substituted for these communications techniques in the future, since the present invention is more directed to the local nature of the communications rather than the specific manner in which such local communications are effected. The present invention has the advantage that it is useful and effective even if only some of the merchants and some of the consumers in a particular local area are participating in the system discussed in the following paragraphs, and the present system may be used to advantage with various forms of communications being used by various merchants and various consumers. In the ideal state, any one of several mobile wireless devices associated with a consumer can communicate with any merchant, and each merchant may be coupled to a wireless communication system through one of several communications channel, although it is expected that a local system may initially be implemented using some subset of the possible channels for local communication.

Figures 1, 2:
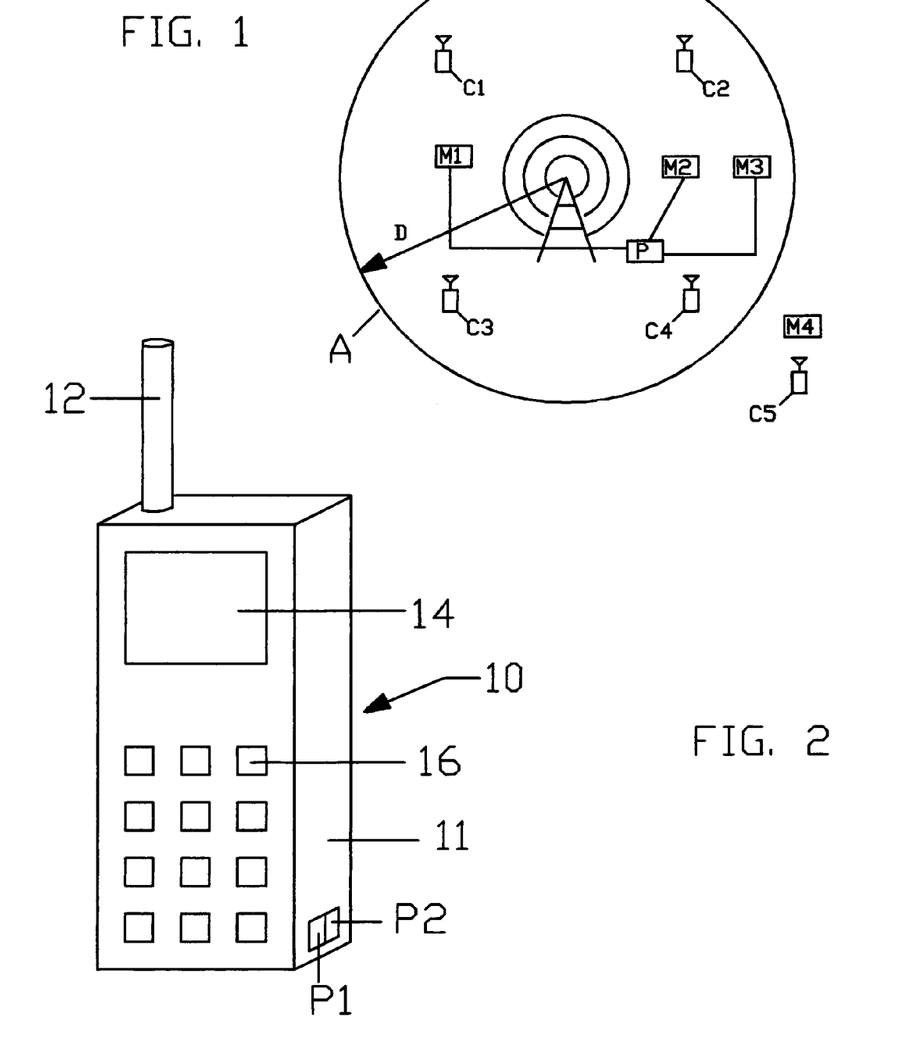
FIG. 1 is a pictorial representation of a shopping area, such as a mall, depicted with consumers, each with a portable wireless communications device.
FIG. 2 is a pictorial view of one example of the portable wireless communications device useful in the embodiment described in connection with FIG. 1.

FIG. 1 illustrates the environment of the present invention where a transmitter T provides local communications in an area A shown by the circle in FIG. 1. A plurality of portable transceivers, each associated with a consumer, are identified as C1, C2, C3, C4 within the local communications area A for the transmitter T. In addition, a transceiver unit C5 is shown outside the local communications area of the transmitter T, and therefore does not communicate with the transmitter T. Three merchants or stores M1, M2, M3 are shown within the local area A and a fourth merchant or store M4 is shown outside of the local area A. Each of the merchant or stores M1 M2 M3 within the area A is shown connected to a processor P which is coupled to transmit and receive information through the transmitter T. The merchant or store M4 outside the local area A is not connected to the processor P and the transmitter T. Merchant or store M4 would probably not be interested in knowing the desires of consumers (like consumers C1 C2 C3 located within the local communications area A) because those consumers are not as likely to deal with him, and the consumer C4 located outside the local communications area A would not be as likely to be interested in an offer from merchants M1 M2 M3 since the consumer is located at some greater distance from the merchants. Conversely, those consumers C1 C2 C3 C4 would be more likely to be interested in dealing with merchants M1 M2 M3, since they are within the local communications area A than with a remotely-located merchant like M4, although if merchant M4 were offering an attractive price on similar merchandise, the consumer might avoid dealing with any of the local merchants, preferring to deal with the merchant who offered a better deal.

The transmitter T may use a picocell of the type according to the standards promoted by Bluetooth consortium and described at its website, www.bluetooth.com, or it may be defined through the use of other conventional and well-known technology such as a wide area network with a global positioning system having a ground coordinate (which may be described as latitude and longitude) as center along with a radial distance from the center to define the local area of interest.

A mobile wireless device associated with each of the consumers is a transceiver which has hardware and programming to make it data capable. That is, it has a stored program which allows portions of its memory to be interrogated and to reply with some stored data and to receive messages which are then displayed on the display associated with the transceiver. The stored programs are, in the preferred embodiment, downloaded from the Internet to allow the mobile wireless device to work with the system (communications protocols and frequencies) of the particular merchant group which the consumer desires to communicate and to do business with. Although the system defines a local area which presumably has a negligible or minimum overlap with other local areas being used by different merchants (for example, the next adjacent shopping area), it is possible to define the local transmission area large enough to overlap and to have a single location be in several different transmission areas, so the communications must allow separation either through selective addressing or through the use of different frequencies. The transceiver may be a modification of a conventional cellular telephone, or it may be some other technology which allows it to send and receive data over the air through wireless network capabilities, such as the systems merchandised by IBM and known as the brick, a personal computer with a keyboard and a display coupled to receive and send wireless messages and frequently carried by remotely-operating employees such as Customer Engineers. The mobile wireless device or transceiver might also be a portable unit like the Palm Pilots in which a displays is coupled to a processor and has a cellular telephone-like connection to a wireless network. Such devices as the Palm Pilot may have data stored in them through either a touch sensitive screen or through the use of downloading of programs and data by connection to another computer, through a data port.

The communications area A is shown defined by a circle whose radius is D from the transmitter T, although this shape and size is solely for convenience in understanding the present invention. In fact, the technology chosen for defining a local communications area somewhat dictates the shape (and, in some cases, the size) of the local area, together with environmental considerations such as terrain and broadcast capabilities. When a wide-area network and global positioning system (GPS) techniques are used to limit the area, then the shape and the size of the communications area may be chosen according to the desires of the designer of the system, with an irregular shape and as much or as little of the surrounding geography as desired. When cellular phone systems are used, one cell may be defined by the areas in which a stronger communications signal is provided than with an adjacent cell.

FIG. 2 illustrates the salient features of one form of mobile wireless device or transceiver 10 useful in the present invention. As shown in this figure, the mobile wireless device 10 includes a housing 11, an antenna 12, a display 14 and a keyboard 16. The mobile wireless device 10 is also provided with ports P1, P2 which may be useful in temporarily attaching the mobile wireless device 10 to a personal computer (not shown) for downloading of data or programs as desired from the personal computer, and/or in uploading data from the mobile wireless device 10 to the personal computer. Messages received by the mobile wireless device 10 and consumer notes might be some examples of information which a consumer would want to upload from his mobile wireless device 10 to his personal computer, since the personal computer would often have greater storage capacities than the mobile wireless device 10.

Figure 3:
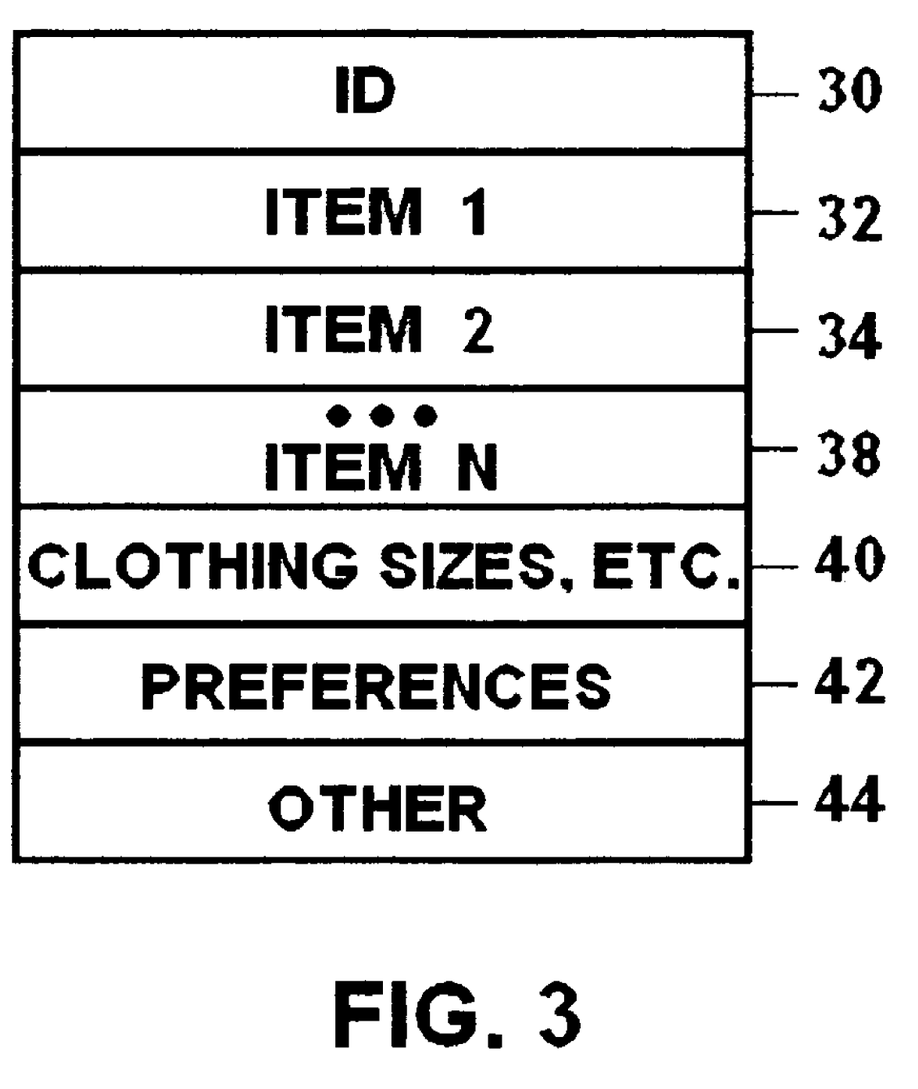
FIG. 3 is a storage diagram illustrating the data stored in the portable wireless communications device of FIG. 2.

FIG. 3 illustrates some of the data which would be stored on the mobile wireless device of the present invention. While the information (and the order of presentation) is somewhat variable depending on the application and the merchants involved, the storage would typically include many of the elements described below. A first region 30 stores identification information—name or identification which may be in the form of an alias in some situations, address (e-mail and/or physical address), personal shopping profile, etc. The next n regions 32, 34, 38 provide the details on prospective purchases (items 1 through n), with the appropriate details on each. For example, the consumer must specify the type of good desired (color television) and the size (if this is a concern), price range, manufacturer, model number, service and warranty information, etc. For each proposed purchase with as much (or as little detail) as the consumer chooses. Obviously, with greater detail, the consumer would get a more focused response from merchants, but if the consumer gets too specific, he may find that there are few (or even no) merchants who provide an offer. So, specificity in identifying goods has trade offs. The storage of the information advantageously is in fields of preset size and contents if it desired that a minimum of information be stored and transmitted, a system that requires additional programming but provides economy in the use of storage and transmission resources. Alternatively, the entire section on each prospective purchase could be in free format (with no definition or limitation)—as much or as little information on the prospective purchase as the consumer wishes to provide in whatever order comes to mind.

As hypertext markup language (HTML) has accelerated the use of the Internet, a standard for data known as XML (for extensible Markup Language) has gained wide acceptance for the exchange of data. Standards specific to the communication for the interchange of data such as exml may simplify exchanges such as the one described above. Examples of XML standards in progress can be found on the Internet at http://www.xmls.com/library/standards.html-.Such standards allow varying types of hardware and software to communicate with each other and allow the interchangeable use of hardware and software and avoid having to specify a particular storage arrangement for data within a hardware or software environment.

Also shown in FIG. 3 are field 40 for clothing sizes and preferences and field 42 for other buying preferences. The field 42 for buying preferences may include such items as the children prefer blue jeans, black ties, computer games in the IBM format, etc. A final field 44 is for other information, such as type of payment (must accept the Visa credit card, charge accounts at Macy's, no service contracts desired, etc.).

Figure 4:
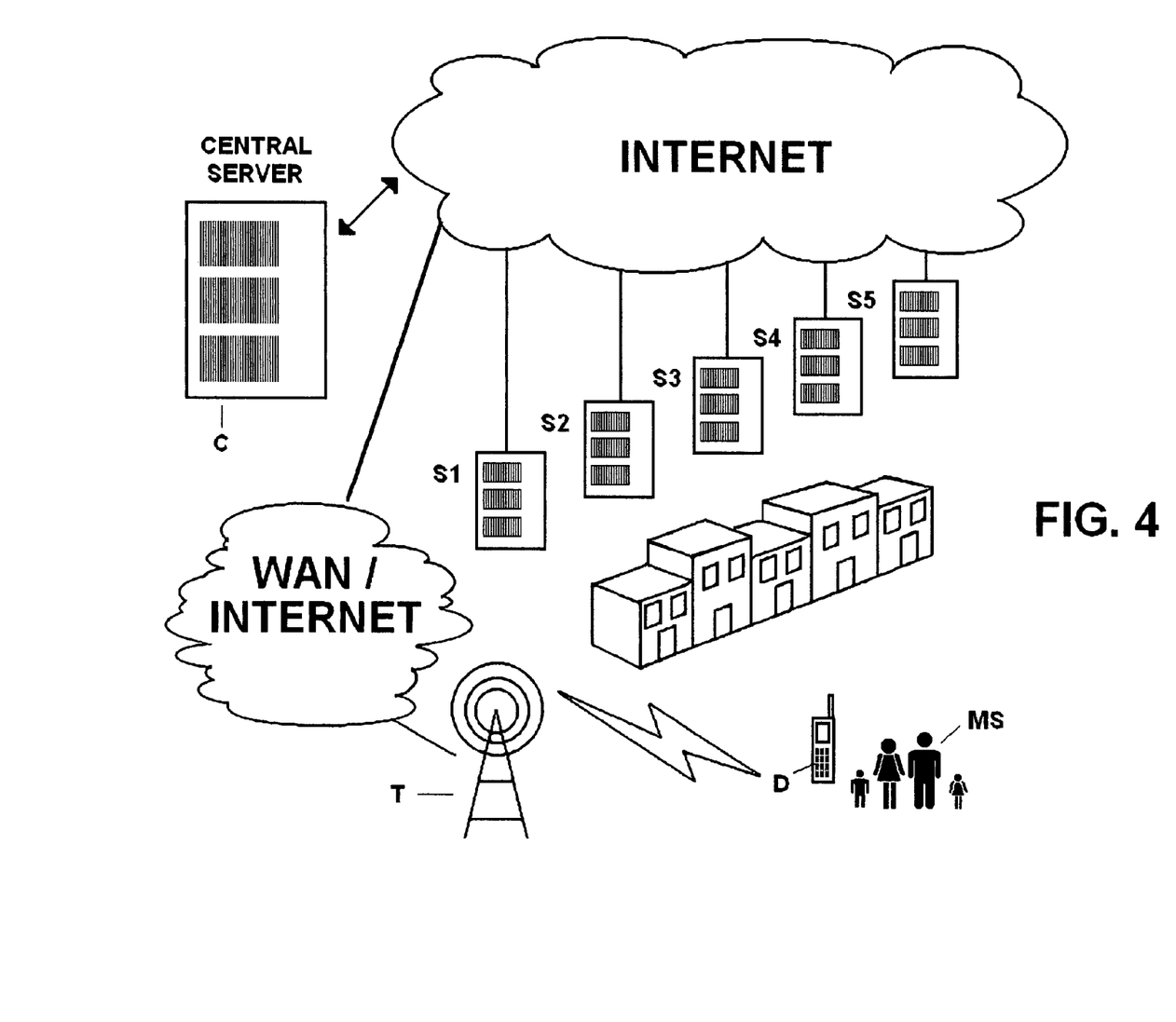
FIG. 4 is a pictorial view of an other form of communication useful in practicing the present invention.

FIG. 4 illustrates a preferred embodiment of the present invention employing cellular communications to couple the merchants with a mobile shopper MS, which could be a family as shown in this figure. In this example, associated with the mobile shopper MS is a wireless mobile device D which has access to the Internet through a cellular tower T. That is, the cellular infrastructure allows the mobile wireless device to have access to the Internet, to send messages to and receive messages from the Internet through a WAN/internet. A central server C connected to the Internet performs a merchant discovery and mediation function. The servers S1, S2, S3, S4 and S5 are connected to the central server C through a telecommunications network (e.g., the Internet). Periodically, the wireless mobile device D reports its location to the central server C via the cellular communications discussed above. The mobile device D knows its own location through a global positioning system (GPS) embedded within the wireless mobile device D or through other means (such as data entry by the mobile shopper M). Alternatively, the cellular carrier (not shown) can note in which cells or microcells the wireless mobile device D is active and communicate this position information as a service to the central server C.

As the family or mobile shopper MS approaches the shopping area, the mobile wireless device D establishes contact with the servers S1, S2, S3, S4 and S5 associated with the stores (or merchants) as mediated by the central server C. That is, a merchant discovery phase occurs where the central server C recognizes the approximate location of the mobile shopper MS and has knowledge of the merchants or stores in a local area proximate to the mobile shopper MS (within a reasonable distance), based on the central server's knowledge of the location of participating merchants within a preset radius of the location of the mobile shopper MS. The central server C thus identifies the merchants or stores which may participate in the proximity e-commerce of the present invention and mediates the connection between the merchants (or stores) and their servers S1, S2, S3, S4, and S5. This mediation can consist of simply forwarding communications from the mobile wireless device D to the servers S1–S5 and from the servers S1–S5 to the mobile wireless device D, thereby freeing the mobile wireless device D from understanding and maintaining addressibility to a large and volatile audience of possible merchants and freeing the merchants from a similar problem of many passers-by. The mediation can be more complex and the central server C may provide application processing on behalf of the mobile wireless device D.

The mobile wireless device D contains information about the family's prospective purchases for the day, either previously stored or entered as the family proceeds. The servers S1–S5 may or may not communicate directly with each other. The mobile wireless device D may send all information on all the items stored as prospective purchases or may send a filtered list depending on the capabilities of the server it is addressing (i.e., avoiding sending the information on clothing purchases to an appliance store). The filtering may be done at the mobile wireless device D or by the central server C, or it may be done may the server (e.g., S1 for a single store and merchant) simply not responding to requested items which are not in its inventory (either directly by sending a negative response or indirectly by making no response).

While this preset range for the local area of communications is somewhat arbitrary and may be adjusted in some situations, it may be the size of a picocell (e.g., on the order of approximately 30 meters) or approximately the size of a shopping mall, if desired. The objective is to locate customers and potential customers within the immediate area who could be induced to shop in person at the merchant's store, if only the customer knew what the merchant was offering at what price. The merchant typically has a large number of diverse goods and does not know what any particular consumer is in the market for until the consumer makes a contact with the merchant, for example, by visiting the merchant's store or by calling the merchant on the telephone. The merchant has inventory of goods which change as goods are sold and as new goods arrive, so any conventional advertisement by the merchant of goods for sale (e.g., telephone book advertising in the yellow pages, newspaper advertisements and printed catalog) may become obsolete even though the consumer still has access to the advertisement.

Figure 5:
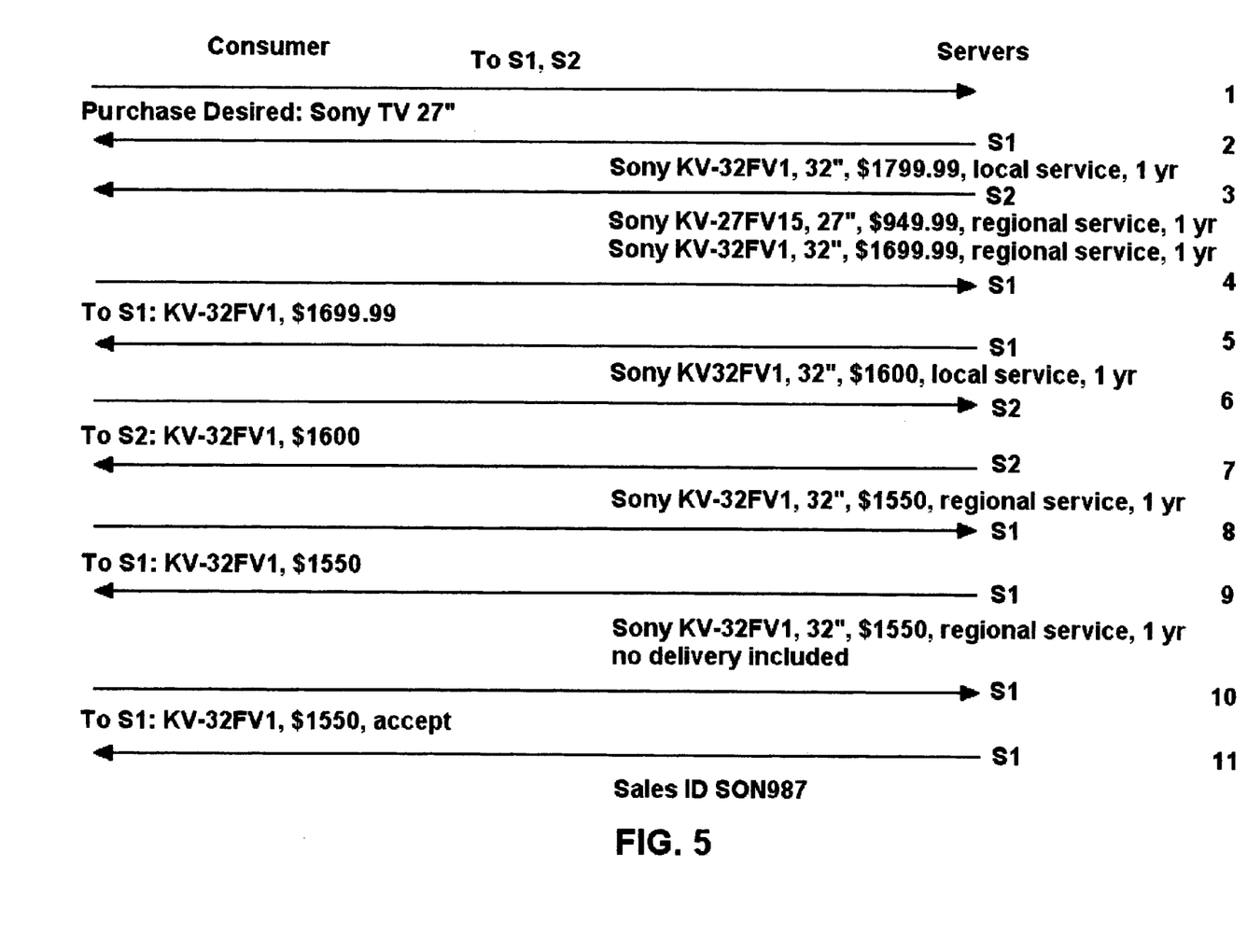
FIG. 5 is an illustration of communications which occur in using the present invention in an auction using a narrow range wireless communications system.

FIG. 5 illustrates a sample communication using the present invention. In this case the consumer C has programmed his transceiver to indicate that he desires to purchase a Sony 27 inch color television. When the consumer C enters the local communications area of the merchants (the area A described in connection with FIG. 1), his transceiver can be interrogated by servers connected to the transmitter T associated with the local merchants and his stored preferences can be read. These stored preferences then can be transmitted to the merchant, to allow either an individual to compare the preferences with the inventory at the store or to allow a program to respond based on stored algorithms, or some combination of the two such as allowing the program to propose a transaction for confirmation by a merchant. In any event, the result of the interrogation of the transceiver associated with the consumer is that one or more merchants may have a transaction to propose to the consumer, and the transaction is conveyed by a message which appears on the screen of the transceiver associated with the consumer. At step 1 the consumer indicates that he desires to purchase a Sony 27 inch television. This message goes to all of the merchants connected in the local area A, but for ease of understanding, we will assume that only two merchants M1 and M2 at servers S1 and S2 are in the business of offering such items or similar. M1 responds through his servers S1 at line 2 that he has a Sony 32 inch television model KV-32FV1 with local service for one year at a price of $1799.99. Merchant M2 responds through his server S2 at line 3 that he offers a Sony 27 inch television model KV-27FV1 at $949.99 and a Sony 32 inch television model KV-32FV1 for 1699.99, both with one year of regional service.

At line 4 the consumer responds to merchant 1 that he has a adverse bid for the 32 inch television at $1699. This response could either be a directed communication by the consumer or it could be automatically generated by the program to allow the merchants to know what the bids are. The merchant M1 responds at line 5 that he offers the same model for $1699 with local service (presumably because local service is more desirable than regional service). At line 6 the consumer reports the offer of merchant M1 to merchant M2 at server S2. In response at line 7 merchant M2 offers the same television at $1550 with regional service, and offer which is reported to merchant M1 at line 8. Merchant M1 responds with an offer of $1550 with local service for the product at line 9, which the consumer then accepts at line 10 and is provided a confirmation number at line 11.

The transaction which the merchant proposes may be exactly what the consumer has requested—a 27 inch Sony television, model KV27FV1, with a one-year warranty and local service or it can be based on the transaction which the consumer has proposed. If the merchant has no such product on hand or does not offer carry-in service, then he would not be in a position to offer exactly what the consumer has requested, and he might offer a transaction as close as he can come to the transaction which the consumer has requested. Alternatively, the merchant may be able to offer what the consumer has requested, but the merchant may believe that he has a better transaction to propose to the consumer—something which will satisfy him more, but which is not the transaction which the consumer had entered. Perhaps the merchant has some of last year's Sony 27 inch televisions available at a better price. Perhaps the merchant has another brand of television of the same size, but at a better price. Or perhaps the merchant can offer the consumer the same model television with an extended warranty (perhaps of two years) at the same price. In such cases, the merchant may or may not propose a transaction which is exactly what the consumer has programmed into his transceiver, but which should interest many of the consumers. It is also possible that the merchant has something to propose to consumers (like a reduced cost oil change, because his facility is empty) which has nothing to do with any programmed information but which the merchant believes may be of interest to the consumer merely because the price is right and the consumer is in the vicinity of the merchant, and so the merchant proposes a transaction over the local area transceiver in the same manner as if it were responding to the stored preferences of the consumer.

Once the consumer has received an offer from a merchant (or multiple offers from multiple merchants), the consumer may wish to communicate further with the merchants. This is especially true in the case where multiple merchants have proposed similar goods and the consumer wishes to conduct an "auction" between the competing merchants. In this case, the consumer can send the merchants a request for additional information—or additional bids—on the merchandise. The transceiver may be programmed to automatically send such information to the merchants to conduct a further bidding, or the consumer can indicate that he wishes to send a message to the merchants on the subject of their bid.

Figure 6:
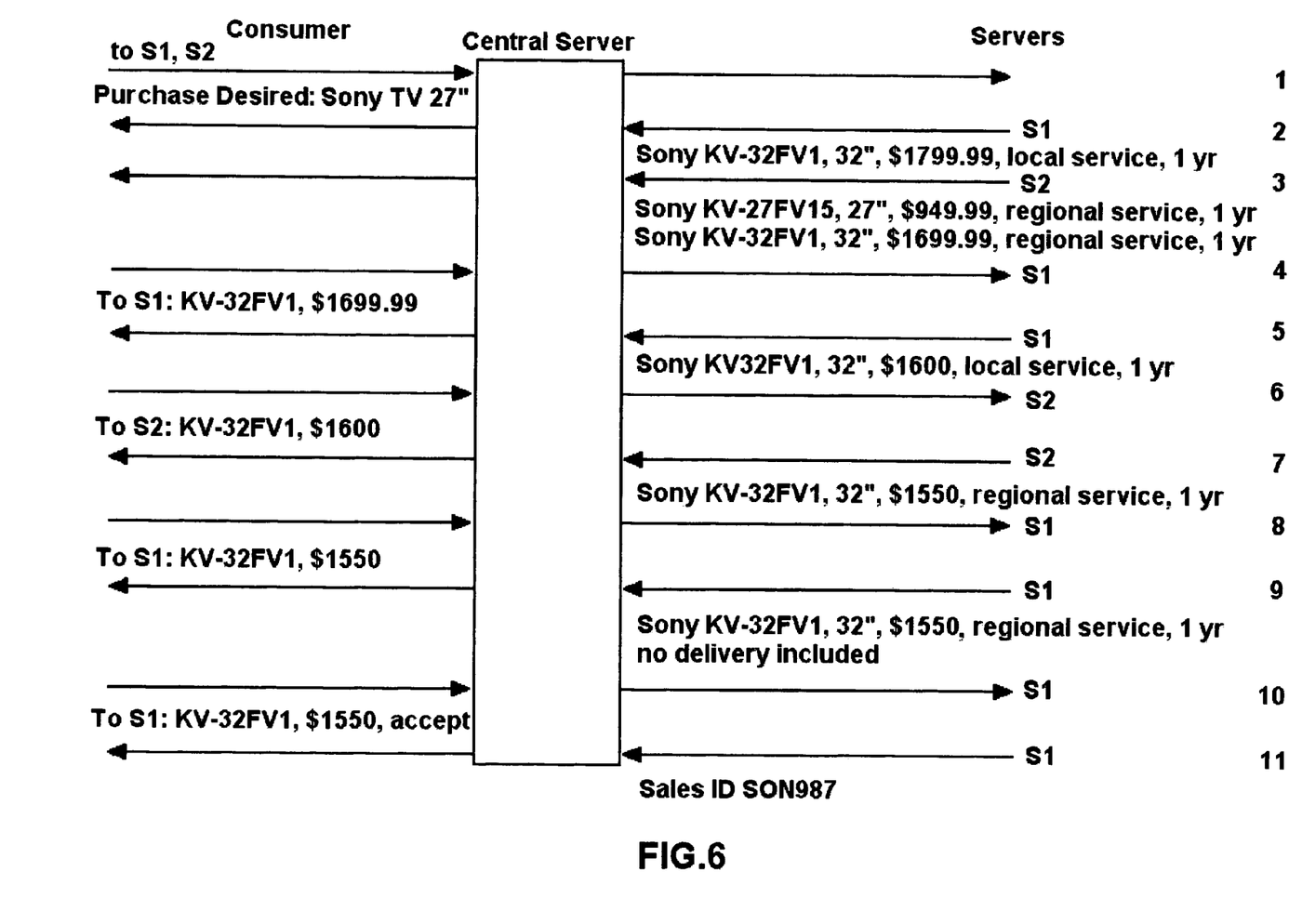
FIG. 6 is a second illustration of an auction using the present invention using cellular phone network.

FIG. 6 illustrates the communication for the present invention using the existing cellular system for communications. The same 11 communications occur (lines 1–11) as shown and described in connection with FIG. 5, but the messages are sent to a central server which, in turn, routes the messages to the appropriate merchant.

Figure 7:
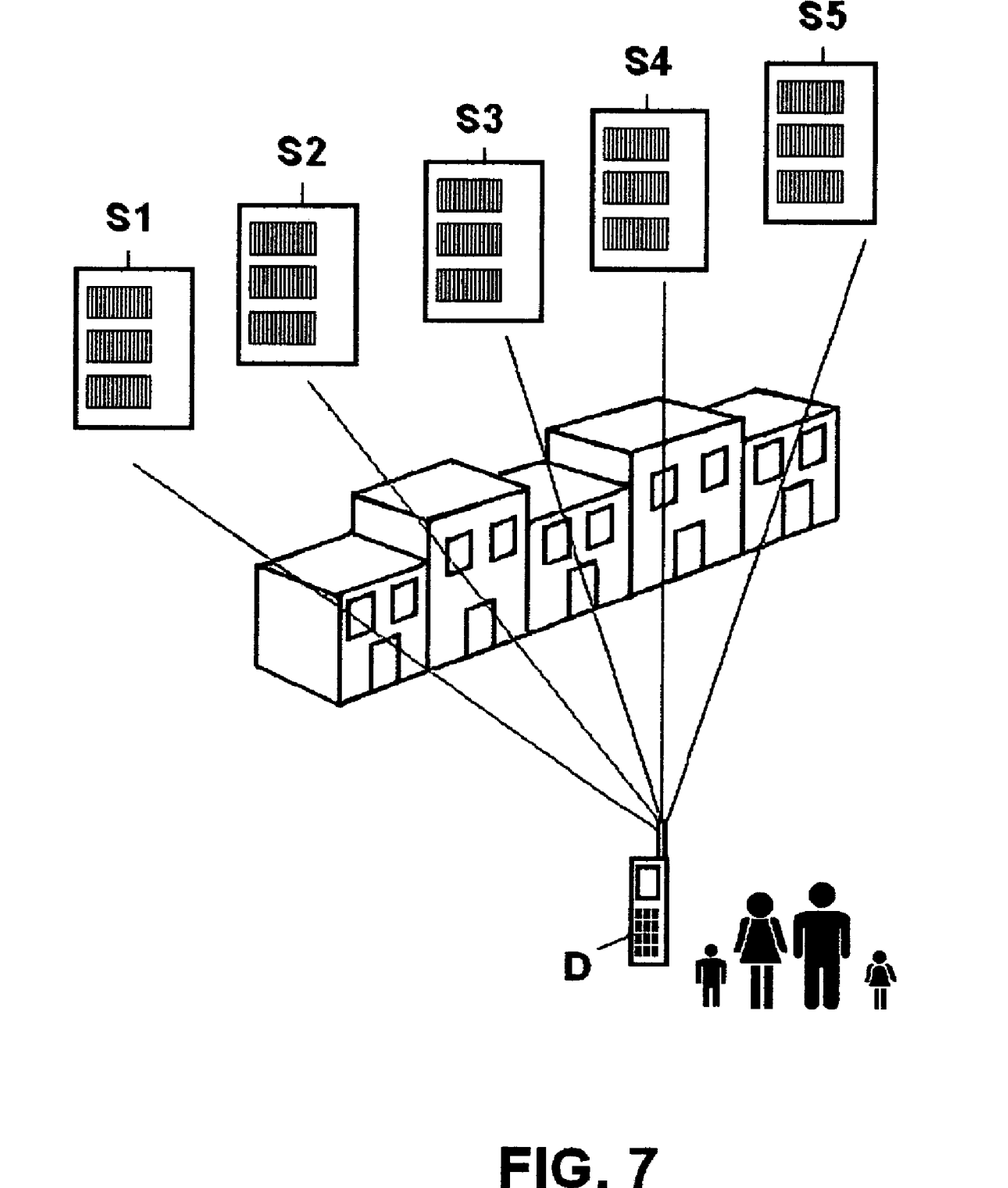
FIG. 7 illustrates an alternate embodiment of the present invention.

The embodiment of FIG. 7 illustrates an alternate embodiment of a wireless mobile device D with a local, restricted range wireless communications system of the type which adheres to the Bluetooth Special Interest Group and is specified on the Internet at *http://www.bluetooth.com*. The Bluetooth wireless communications system encompasses ScatterNet, a protocol for ad hoc creation of wireless networks in a localized physical area. According to the Bluetooth website, over 1300 companies are members of this special interest group as of December, 1999, including 3COM, Ericsson, IBM, Intel, Lucent and Microsoft. Of note in the present figure that there is not central transmitter as there is in the embodiment of FIG. 4, for example, because this technology operates on the basis of ad hoc peer-to-peer communications and requires no central transmitter, since each Bluetooth radio modem itself can transmit.

In FIG. 7, as the consumer (and his family, as shown) approach the shopping area with his mobile wireless device D and comes within range, the mobile wireless device D establishes communications with the servers S1, S2, S3, S4 and S5 associated with the respective merchants (and stores) in the area. As in previously discussed embodiments, the mobile wireless device D contains stored information on the consumer's prospective purchases that day, either as previously stored in the mobile wireless device D or as entered as the consumer proceeds. The servers S1–S5 may or may not directly communicate with each other in this example, The mobile wireless device D may send information on all items registered as prospective purchases to each server and the associated merchant or store or the device may send a filtered list of prospective purchases depending on the capabilities of the server—i.e., a prospective purchase of clothing might not be sent to an appliance store if the server for the appliance store communicates with the mobile wireless device to advise of its merchandise. If the server S1 does not have a match for any of the prospective purchases stored in the mobile wireless device D, the stored application may require a negative acknowledgment to be sent; in any event, the mobile wireless device D may conclude from the lack of a substantive response that no match exists.

If the server S1 does have a match for goods which are stored in the consumer's mobile wireless device D, the server S1 advises the mobile wireless device D and offers a price and/or other terms such as a service agreement. If the consumer wishes to accept the offer (price or other terms) from the server S1, either based on a stored policy or based on a user input from the consumer, the mobile wireless device D sends a response to the server S1, notifying it that agreement has been reached. If the consumer does not agree with the price and/or other terms, it informs the server S1 and the server S1 may make another offer to the consumer through a message sent to the mobile wireless device D1. Alternatively, the merchant (through his server S1) may propose an alternate offering, and that offer may result in an acceptance or a counteroffer. The same sequence may be repeated with other servers on each item until either an agreement has been reached or one party concludes that no agreement will be reached. The mobile wireless device D may be in communications with multiple servers simultaneously and use the results of one interaction to inform its actions on another interaction. Since the communications range is small (currently up to about 100 meters maximum), the mobile wireless device D may be in communication with only one or two servers at a time, making this commerce in a truly local area.

Of course, many modifications of the present invention will be apparent to those skilled in the relevant art in view of the foregoing description of the preferred embodiment, taken together with the accompanying drawings. For example, the function of a communications transceiver could be accomplished in different ways other than the disclosed cell phone, such as a smart card, a Palm Pilot or other similar portable communication device which is carried by the consumer. The picocell communications to locate a potential consumer in the nearby area to the merchant could easily be replaced by a satellite-based global position system (GPS) which would have the added advantage of allowing the geographic area to be variable and specified by a merchant, an advantage if one type of merchant wishes to target consumers in a smaller area that another merchant. The consumer himself could indicate the geographic area in which he wishes to communicate with merchants, if desired. Additionally, some of the features of the present invention can be employed to advantage without the corresponding use of other features without departing from the spirit of the present invention. For example, the negotiation of an auction is a desirable, although not essential, feature of the present invention, and the provision of concluding the transaction in person might be dispensed with in an appropriate situation, such as the purchase of a large item which would be delivered, rather than picker up. Accordingly, the foregoing description of the preferred embodiment should be considered as merely illustrative of the principles of the present invention and not in limitation thereof.

What is claimed is:

1. A system for communication of a proposed commercial transaction in a local area comprising:
  a mobile wireless device associated with a consumer, the mobile wireless device including a storage for receiving and storing information related to consumer preferences and an antenna for communicating directly with local merchants in the local area over a short range, ad-hoc, wireless communication link;
  a short range wireless communications system adapted to communicate with the mobile wireless device associated with a consumer within the local area, wherein the local area is defined by proximity of the mobile wireless device to said short range wireless communication system and physical coverage of said short range wireless communication system, said short range wireless communications system being associated with a first merchant of a proposed offer and transmitting the proposed offer directly to the mobile wireless device associated with the consumer; and
  the mobile wireless device including a system which receives a user input indicating that the information from the first merchant is to be transmitted to a second merchant within the local area, wherein the mobile wireless device transmits the information received from the first merchant directly to the second merchant over another short range wireless, ad-hoc communication link in response to a user input.

2. A system for communication of a proposed commercial transaction in the local area including the elements of claim 1 wherein the mobile wireless device associated with the consumer is a cellular telephone with storage including preferences loaded by the consumer and the short range wireless communications system operates over a limited local area.

3. A system for communication of a propose commercial transaction in the local area including the elements of claim 1 wherein the short range wireless communication system complies with the Bluetooth specification.

4. A system for communication of a proposed commercial transaction in the local area including the elements of claim 1 wherein the offer communicated to the consumer matches the consumer preferences stored in the mobile wireless device.

5. A system for conducting an auction between two merchants each having a fixed location and a consumer located proximate to the two merchants, the consumer associated with a mobile wireless device, the system comprising:
- a mobile wireless device associated with the consumer including memory for storing details of a proposed transaction and a communications device for exchanging messages directly with at least a first merchant and a second merchant related to the proposed transaction over short range, ad-hoc, wireless communication links;
- a comparator in the mobile device for comparing the messages from the first merchant and the second merchant to determine which message offers the better deal; and
- a transmission system responsive to comparison in the mobile device for sending at least one merchant the details of the better deal and for receiving a message from at least one merchant in response to the details of the better deal, wherein the communications between the mobile wireless device and the merchants are exchanged directly between one another without utilization of a central processing system.

6. A system for conducting an auction including the elements of claim 5 and further including a system, disposed within the mobile wireless device, for comparing the received message from the merchant in response to the details of the better deal and for communicating that received message directly to another merchant over another one of the short range wireless communication links.

7. A program stored on a storage medium adapted to be read by an information handling system, the program comprising:
- a first module for storing consumer preferences;
- a second module for transmitting consumer preferences directly to individual merchant systems over short range, ad-hoc, wireless communication links in response to an interrogation by an external system;
- a third module for receiving bids from the external system and for storing those bids;
- a fourth module for comparing bids to determine the best bid and for receiving an input at a mobile device whether to communicate a bid from one bidder to a second bidder and, if sending is indicated, sending the best bid to an other bidder directly over a short range, ad-hoc, wireless communication link; and
- a fifth module for displaying the best bid received so that the consumer can acknowledge the bid;
- wherein each individual merchant system with which communication is established is determined via proximity and a physical coverage area of the individual merchant system.

8. A system for communicating regarding a proposed transaction between a consumer and potential merchants, the system comprising:
- a wireless device associated with the consumer which includes a system for receiving and transmitting information directly to and from individual merchant systems over short range, ad-hoc, wireless communication links about a potential purchase and receiving a consumer input;
- a plurality of short range wireless communications systems, wherein each of at least a first and a second potential merchant is associated with one of said plurality of short range wireless communication systems, each of said first and second merchants seeking to make a transaction with the consumer relating to the proposed transaction, the short range wireless communication system associated with the first merchant transmitting directly to the wireless device a first bid from the first merchant and receiving information on the first bid from the wireless device, wherein said wireless device transmits information on said first bid to the short range wireless communication system associated with the second merchant in response to the consumer input.

9. A system for communicating a proposed transaction as provided in claim 8 and further including a sensor for determining merchants which are proximate to the consumer and his wireless device so that the consumer is dealing with merchants in a defined geographic area, wherein said sensor detects short range wireless networks and does not determine a location for the wireless device or the communication systems associated with the merchants.

10. A system for communicating a proposed transaction of the type set forth in claim 8 wherein, when the wireless device receives a response from the merchant which includes a proposal of an alternate transaction, the details of the alternate transaction are sent to an other merchant to receive a bid from the other merchant.

11. A system for communicating a proposed transaction of the type set forth in claim 10 wherein the wireless device includes a screen and displays the communications which have been received from merchants regarding the proposed transaction.

12. A method of proposing between a merchant and a potential customer with a mobile wireless device, the steps of the method comprising:
- receiving at the mobile wireless device a bid sent directly from a first merchant over a short range, ad-hoc, wireless communication link regarding a potential purchase and receiving a customer input;
- transmitting information regarding the bid from the first merchant from the mobile wireless device directly to a second merchant over another short range, ad-hoc, wireless communication link in response to the customer input at the mobile wireless device; and
- receiving at the mobile wireless device a bid sent directly from the second merchant over the other short range, ad-hoc, wireless communication link regarding the proposed purchase, whereby the potential customer may compare the first bid from the first merchant with the second bid from second merchant for the potential purchase;
- wherein the mobile wireless device selects the first and second merchants for communication, at least in part, by virtue of proximity and physical coverage of the short range, ad-hoc wireless communication links.

13. A method of proposing commerce between a consumer and a merchant including the steps of claim 12 wherein the method further includes receiving and transmitting information only within a limited area, whereby the customer is proximate to the merchants at the time of the communications.

14. A method of proposing commerce between a consumer and a merchant including the steps of claim 12 wherein the method includes storing consumer preferences in the mobile wireless device and the communications includes information from the stored consumer preferences.

* * * * *